United States Patent
Slane

(10) Patent No.: US 6,279,140 B1
(45) Date of Patent: Aug. 21, 2001

(54) METHOD AND APPARATUS FOR CHECKSUM VERIFICATION WITH RECEIVE PACKET PROCESSING

(75) Inventor: Albert Alfonse Slane, Oronoco, MN (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/226,684

(22) Filed: Jan. 7, 1999

(51) Int. Cl.[7] .......................... G06F 11/10; H03M 13/00
(52) U.S. Cl. ................................................ 714/807
(58) Field of Search ................................................ 714/807

(56) References Cited

U.S. PATENT DOCUMENTS

| | | | | |
|---|---|---|---|---|
| 5,260,936 | * | 11/1993 | Bardet et al. .................. | 370/428 |
| 5,430,842 | * | 7/1995 | Thompson ..................... | 709/236 |
| 5,500,864 | * | 3/1996 | Gonie et al. ................... | 714/807 |
| 5,675,591 | * | 10/1997 | Salzwedel et al. ............. | 714/807 |
| 5,701,316 | * | 12/1997 | Alferness et al. .............. | 714/807 |
| 5,815,516 | * | 9/1998 | Aaker et al. ................... | 714/807 |
| 5,987,022 | * | 11/1999 | Geiger et al. .................. | 370/349 |
| 6,084,859 | * | 7/2000 | Ratcliff ........................... | 370/252 |
| 6,105,160 | * | 8/2000 | Fukumoto et al. ............. | 714/776 |

OTHER PUBLICATIONS

RFC 768, "User Datagram Protocol", by J. Postel, Aug. 28, 1980, pps. 1–3.
RFC 791, "Internet Protocol", by USC/Information Sciences Institute, Sep. 1981, pps. 1–45.
RFC 792, "Internet Control Message Protocol", by J. Postel, Sep. 1981, pps. 1–21.
RFC 793, "Transmission Control Protocol", by USC/Information Sciences Institute, Sep. 1981, pps. 1–85.
RFC 1883, "Internet Protocol, Version 6 (IPv6) Specification", by S. Deering and R. Hinden, Dec. 1995, pps. 1–37.

* cited by examiner

Primary Examiner—Albert DeCady
Assistant Examiner—Joseph Torres
(74) Attorney, Agent, or Firm—Joan Pennington

(57) ABSTRACT

A method and apparatus are provided for checksum verification with receive packet processing for communications over a data communications network. First a data communications connection is identified. Responsive to an identified data communications connection, a start of data packet is identified. Then a header checksum is calculated. A protocol checksum including a protocol pseudo header and data is calculated. An embedded processor structure is used for tracking packet state and running CRC calculations across received packets, and performing full checksum verification.

16 Claims, 13 Drawing Sheets

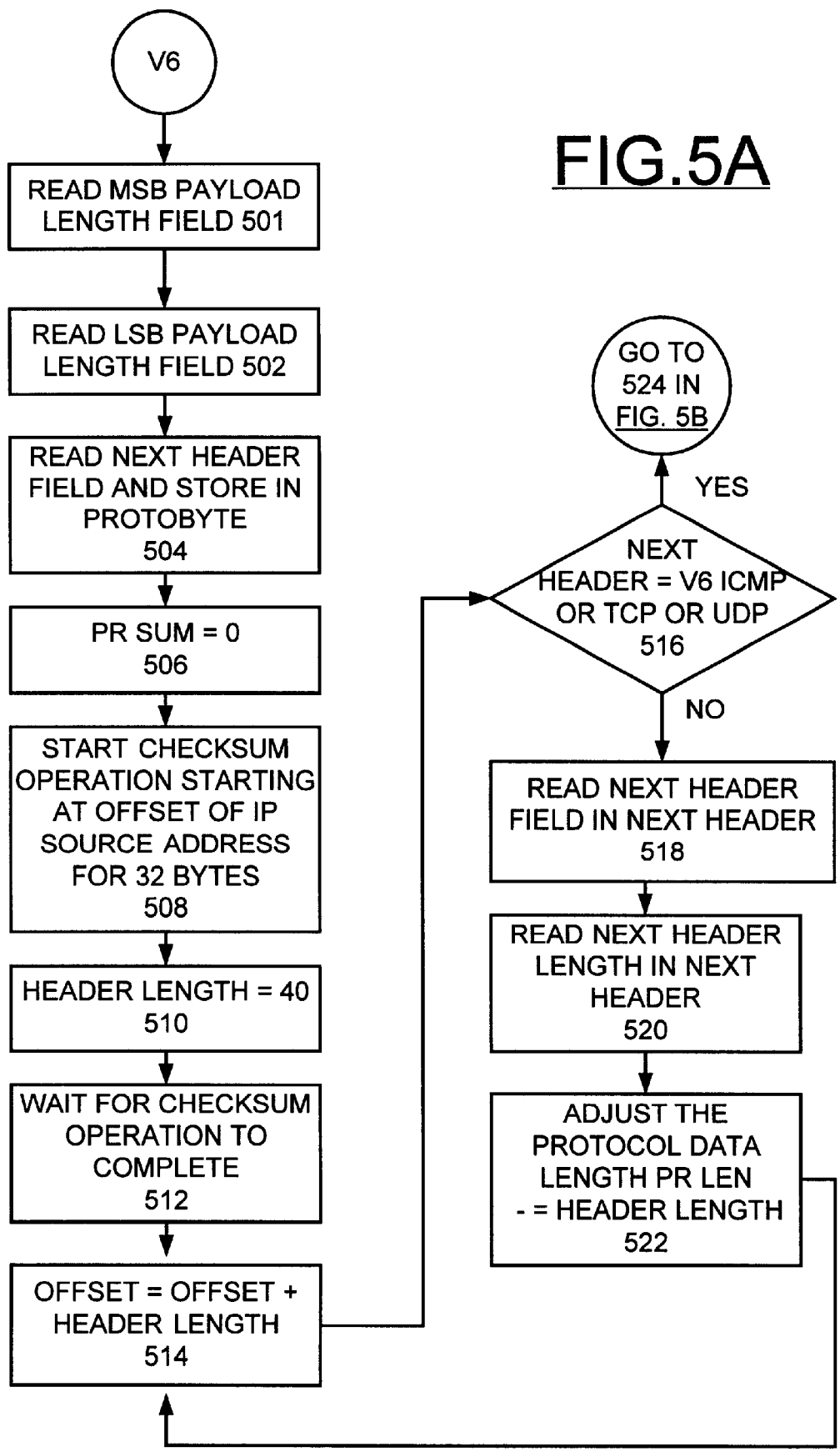

INTERNET HEADER FORMAT 600  PRIOR ART

```
 0                   1                   2                   3
 0 1 2 3 4 5 6 7 8 9 0 1 2 3 4 5 6 7 8 9 0 1 2 3 4 5 6 7 8 9 0 1
```

| VERSION | IHL | TYPE OF SERVICE | TOTAL LENGTH |||
|---|---|---|---|---|---|
| IDENTIFICATION ||| FLAGS | FRAGMENT OFFSET ||
| TIME TO LIVE || PROTOCOL | HEADER CHECKSUM |||
| SOURCE ADDRESS ||||||
| DESTINATION ADDRESS ||||||
| OPTIONS ||||| PADDING |

FIG.6A

ICMP MESSAGE FORMAT 610  PRIOR ART

```
 0                   1                   2                   3
 0 1 2 3 4 5 6 7 8 9 0 1 2 3 4 5 6 7 8 9 0 1 2 3 4 5 6 7 8 9 0 1
```

| TYPE | CODE | CHECKSUM |
|---|---|---|
| UNUSED |||
| INTERNET HEADER 600 + 64 BITS OF ORIGINAL DATA DATAGRAM |||

FIG.6B

UDP DATAGRAM HEADER FORMAT    800    PRIOR ART

| SOURCE PORT | DESTINATION PORT |
|---|---|
| LENGTH | CHECKSUM |
| DATA OCTETS * * * ||

FIG.8A

V4 UDP PSEUDO HEADER    810    PRIOR ART

| SOURCE ADDRESS | | |
|---|---|---|
| DESTINATION ADDRESS | | |
| ZERO | PROTOCOL | UDP LENGTH |

FIG.8B

INTERNET IP V6 HEADER FORMAT    900    PRIOR ART

| VERSION | PRIO. | FLOW LABEL | | |
|---|---|---|---|---|
| PAYLOAD LENGTH | | | NEXT HEADER | HOP LIMIT |
| SOURCE ADDRESS | | | | |
| DESTINATION ADDRESS | | | | |

FIG. 9A

TCP & UDP PSEUDO HEADER
FORMAT FOR IP V6    910    PRIOR ART

| SOURCE ADDRESS | |
|---|---|
| DESTINATION ADDRESS | |
| PAYLOAD LENGTH | |
| ZERO | NEXT HEADER |

FIG. 9B

OPTIONS HEADER    920    PRIOR ART

| NEXT HEADER | HDR EXT LEN | |
|---|---|---|
| HEADER | | |

FIG. 9C

METHOD AND APPARATUS FOR CHECKSUM VERIFICATION WITH RECEIVE PACKET PROCESSING

FIELD OF THE INVENTION

The present invention relates generally to the data processing field, and more particularly, relates to a method and apparatus for checksum verification with receive packet processing for data communications.

DESCRIPTION OF THE RELATED ART

In any communication system, it is desirable to detect data transmission errors. Packets transmitted across a communications network between nodes contain data and a header that describes the data. Typically, such as with known communication systems utilizing an internet protocol (IP), a sending computer or node sends a header and then data.

One known method called TCP/IP checksum assist has proven to be very beneficial to server systems in terms of CPU utilization and overall throughput. Checksum assist is the process of generating a partial protocol checksum with minimal user intervention. This process is done concurrently with the DMA process when the data is traversed when being moved to a host. The partial sum is exposed to the user, and the user then does more work to verify the eventual checksum using values from the IP protocol header. This method does not address the IP header checksum, the overhead of completing the sum, or the checksum process when the data is not being DMAed, such as when a data frame is sent to on-chip processor.

U.S. Pat. No. 5,815,516 issued Sep. 29, 1998 to Aaker et al., and assigned to the present assignee discloses a method and apparatus for producing transmission control protocol (TCP) checksums using internet protocol (IP) fragmentation. The transmission communication protocol (TCP) uses a checksum to protect the data which is transmitted. This checksum is located in the TCP header of the internet datagram packet. In the disclosed method, a transmission control protocol module receives packet data to be transmitted and prepares a first internet protocol data fragment without a checksum for the received packet data. The first internet protocol data fragment is transmitted. Collecting checksum is performed during the transmission of the first internet protocol data fragment. Then an internet protocol header fragment including the collected checksum is transmitted.

A need exists for an improved method and apparatus for checksum verification with receive packet processing for data communications. It is desirable to provide full checksum verification on the currently used IP version 4 for data communications and new and different protocols including the proposed protocol IP version 6 for data communications.

SUMMARY OF THE INVENTION

A principal object of the present invention is to provide an improved method and apparatus for checksum verification with receive packet processing for data communications. Other important objects of the present invention are to provide such method and apparatus for checksum verification with receive packet processing for use with a variety of modes for communications and to provide such method and apparatus that overcome disadvantages of prior art arrangements.

In brief, a method and apparatus are provided for checksum verification with receive packet processing for communications over a data communications network. First a data communications connection is identified. Responsive to an identified data communications connection, a start of data packet is identified. Then a header checksum is calculated and a protocol checksum including a protocol pseudo header and data is calculated. In accordance with features of the invention, an embedded processor structure is used for tracking packet state and running CRC calculations across received packets, and performing full checksum verification.

BRIEF DESCRIPTION OF THE DRAWINGS

The present invention together with the above and other objects and advantages may best be understood from the following detailed description of the preferred embodiments of the invention illustrated in the drawings, wherein:

FIGS. 3, 4A, 4B, 5A, 5B and 5C are flow charts illustrating exemplary steps performed by the nano-processor structure for checksum verification with receive packet processing of the preferred embodiment;

FIG. 6A is a diagram illustrating an exemplary internet protocol (IP) version 4 (V4) datagram header format;

FIG. 6B is a diagram illustrating an exemplary internet control message protocol (ICMP) message format;

FIG. 8A is a diagram illustrating an exemplary user datagram protocol (UDP) header format;

FIG. 8B is a diagram illustrating an exemplary user datagram protocol (UDP) pseudo header format;

FIG. 9A is a diagram illustrating an exemplary internet protocol (IP) version 6 (V6) datagram header format;

FIG. 9B is a diagram illustrating an exemplary transmission communication protocol (TCP); user datagram protocol (UDP); and internet control message protocol (ICMP) pseudo header format for internet protocol (IP) version 6 (V6);

FIG. 9C is a diagram illustrating an exemplary options header format of a next header for internet protocol (IP) version 6 (V6)

DETAILED DESCRIPTION OF THE PREFERRED EMBODIMENTS

Figure 1:
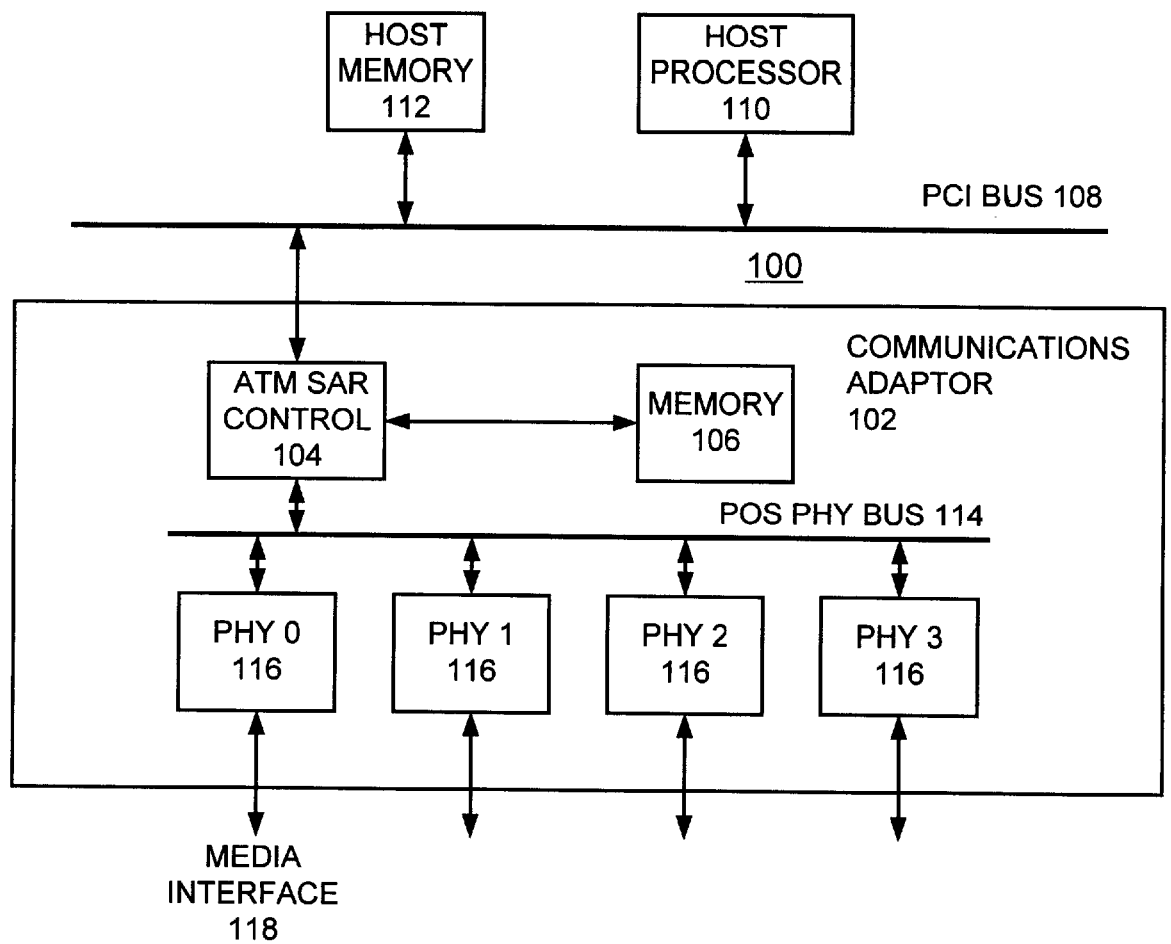
FIG. 1 is a block diagram representation illustrating a communications adapter of the preferred embodiment.

Having reference now to the drawings in FIG. 1, there is shown a communications system generally designated by 100 including a communications adapter generally designated by 102 and arranged in accordance with the preferred embodiment. As shown in FIG. 1, adapter 102 includes an ATM segmentation and reassembly control 104 of the preferred embodiment. The ATM SAR control 104 is coupled to or includes a local memory 106. As shown, the ATM SAR control 104 is connected to a peripheral component interconnect (PCI) bus 108 coupled to a host processor 110 and a host memory 112. The ATM SAR control 104 is connected by a packet over SONET (POS) physical bus 114 to a plurality of physical (PHY) layer 116. Each of the multiple physical layers 116 is connected to a respective media interface 118. Adapter 102 provides interface and translator functions between the PHY layers 116 and the peripheral component interconnect (PCI) bus 108. Adapter 102 includes a transmission logic function (not shown) and a cell scheduler (not shown). Adapter 102 is illustrated in simplified form sufficient for an understanding of the present invention.

Figure 2:
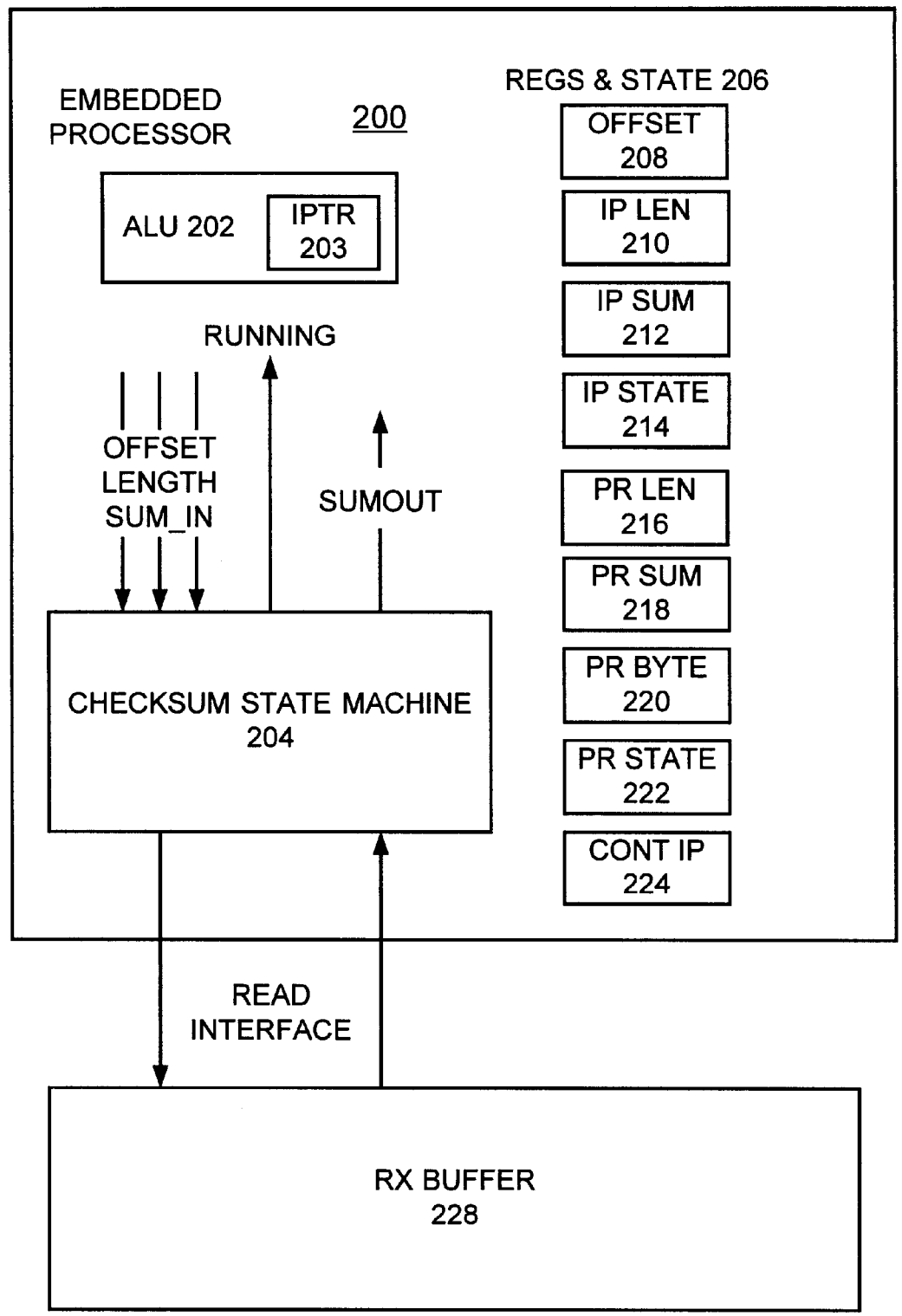
FIG. 2 is a schematic diagram representation illustrating a nano-processor structure for checksum verification with receive packet processing of the preferred embodiment.

FIG. 2 illustrates a nano-coded embedded processor architecture or structure generally designated by 200 included within the ATM SAR control 104 and arranged in accordance with the preferred embodiment. Nano-coded embedded processor architecture 200 includes an arithmetic logic unit (ALU) 202, an instruction pointer (IPTR) 203 and a checksum state machine 204. As part of the receive process, the small fast nano-coded embedded processor structure 200 executes RISC-like instructions. This processor 200 has responsibility for tracking packet state for packet based adapters 102, running CRC calculations across received packets, and performing full checksum verification of the preferred embodiment. The method of full checksum verification of the preferred embodiment is illustrated and described with respect to FIGS. 3, 4A, 4B, 5A, 5B and 5C. The full checksum verification of the preferred embodiment includes the calculation of a header checksum and a protocol checksum including a protocol pseudo header and data. Embedded processor 200 includes registers and state 206 including 16 bits offset 208, 8 bits IP length 210, 17 bits IP sum 212, 2 bits IP state 214, 16 bits protocol length 216, 17 bits protocol sum 218, protocol byte 220, 2 bits protocol state 222 and continue IP 224. A receive (RX) buffer 228 provides read data to the checksum state machine 204.

Received packets are associated with a connection which corresponds to a logical channel descriptor (LCD) in communications adapter 102. The LCD is used to store configuration information, for example, an identification of an IP connection and state information for the checksumming algorithm. State must be keep because the received packets are handled a cell at a time in both the ATM and packet physical cases. The state can be rather significant and can include, for example, 128 bits of information. Full checksum verification has not been done before generally because the packets must be handled a cell at a time. Numerous problems arise because it is not known how much of the headers are in the current buffer. For example, the destination IP address might be split across two cell buffers, which means the algorithm must be byte oriented and checking must be provided to determine if the byte of interest is contained in the current buffer. When the byte is not in the current buffer, the process needs to save the current state and restart the process where it left off when the next cell is received and processed.

In accordance with features of the preferred embodiment, the implementation of communication adapter 102 can be configured on a per connection basis for different users needs. This allows adapter 102 to be used in different environments in a cost effective manner. It also allows the algorithm to adapt to new and different protocols that may emerge in the internet community. Embedded processor 200 is easy to program and use due to the built in checkpointing and resumption facilities.

Referring now to FIGS. 3, 4A, 4B, 5A, and 5B, exemplary steps for checksum verification with receive packet processing start at a block 300. FIGS. 3, 4A, 4B, 5A, and 5B illustrate generally the algorithm in accordance with the preferred embodiment that is followed as a cell/packet is processed. Checking for an IP connection is performed as indicated at a block 302. When an IP connection is not identified, this completes the sequential operations as indicated at a block 322. When an IP connection is identified, the start of the IP protocol header is identified as indicated at a decision block 304. The start of the IP protocol header can be different on a per connection basis. For example, one connection might be running Ethernet, while another connection might be running LANE, and another might be running Native IP. Generally, this step involves making a jump (JMP) to the connection specific LCD piece of code that finds the IP header as indicated at a block 306. The IP header locator code is executed to get the offset to IP header as indicated at a block 308. Finding the start of the IP protocol header can be as simple as using a fixed offset, or can involve reading some bytes to skip past a variable number of bytes.

The IP version is read from the IP header as indicated at a block 310. An internet header format 600 is illustrated and described with respect to FIG. 6A. The 4 bit Version field indicates the format of the internet protocol header. FIG. 6A illustrates the IP header version 4 (V4) format. FIG. 9A illustrates the IP header version 6 (V6) format. Both versions 4 and 6 of IP are concurrently supported on the same adapter 102. At blocks 308 and 310 are steps in the process where the algorithm can block and the process saves the current state and restores the state to restart the process where it left off when the next cell is received and processed. When IP version 4 is identified as indicated at a decision block 312, the sequential operations continue following entry point V4 in FIG. 4A. When IP version 6 is identified as indicated at a decision block 314, the sequential operations continue following entry point V6 in FIG. 5A. Otherwise when neither version 4 or 6 are identified, then the IP state is set to not checked as indicated at a block 316. The protocol state is set to not checked as indicated at a block 318. This completes the sequential operations as indicated at a block 320.

When a start of packet is not found at decision block 304, then a continue instruction is executed to continue the checksum verification algorithm where last left off as indicated at a block 324. The instruction pointer (IPTR) 203 in ALU 202 is set to CONT IP 224, all regs and state 206 are restored, and checksums are restarted, if pending, as indicated at a block 326. Then the operations go back to the block where the checksum verification algorithm left off as indicated at a line labeled CONTINUE.

Figure 4A:
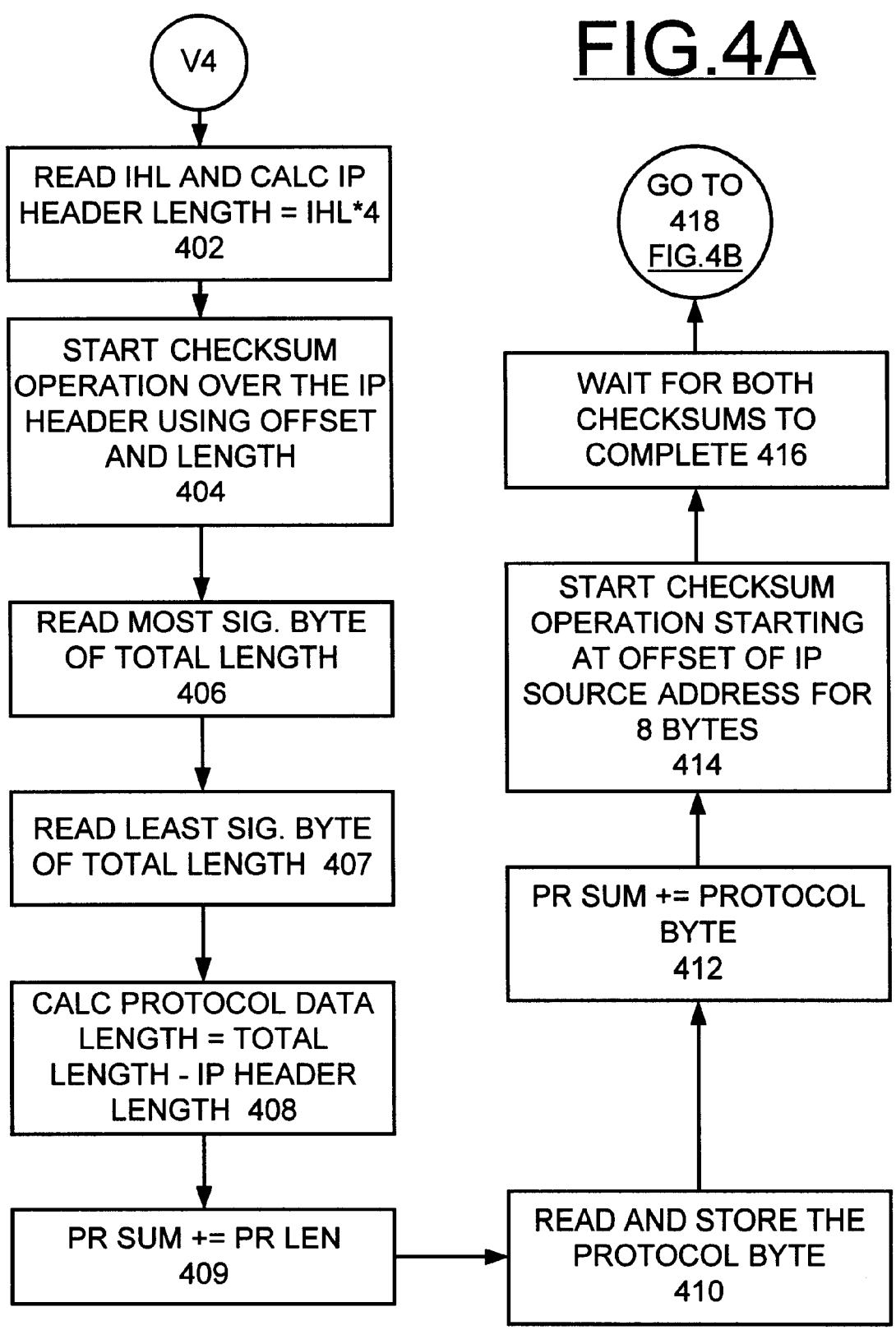

Referring now to FIG. 4A, next the Internet Header Length (IHL) field is read and the IP header length is calculated by IHL*4 as indicated at a block 402. The 4 bit Internet Header Length (IHL) shown in FIG. 6A, indicates the length of the internet header in 32 bit words, and points to the beginning of the data. Then the checksums operation over the IP header is started using OFFSET 208 and length IP LEN 210 as indicated at a block 404. This process may block if the entire header is not present in the current cell. If this is the case, the final checksum state is retained and the operation is continued when the next cell arrives. The most significant byte of the TOTAL LENGTH field is read as indicated at a block 406, the least significant byte of the TOTAL LENGTH field is read as indicated at a block 407 and the protocol data length is calculated using the total length field and the IP header length, where protocol data length equals TOTAL LENGTH minus the calculated IP Header length as indicated at a block 408. The reading of the TOTAL LENGTH field is piecemeal because the field could be split across cells and also each read could block. Once calculated, the protocol data length value is added to the protocol sum because it is part of the pseudo header used for the protocol checksum. As indicated at a block 409 the PR LEN 216 is added to the PR SUM 218. The PROTOCOL byte field is read and stored as indicated at a block 410. The reading of the PROTOCOL byte field could block. The PROTOCOL byte specifies what the next protocol header is in the packet. Typical values are UDP, TCP, and ICMP. Each protocol has slightly different characteristics in the checksum that it uses. The PROTOCOL byte is also added into the protocol sum as part of the pseudo header as indicated at a block 412. The checksum operation is started at offset of IP source address for 8 bytes as indicated at a block 414. The calculation of the pseudo header by adding in the IP source and destination fields is accomplished using a second checksum operation due to the size of addresses and because the bytes are contiguous. This second checksum operation can block if the bytes are not all available in the buffer. Then waiting for both checksum operations to complete is performed as indicated at a block 416. At block 416, if it is determined that either sum will not complete in this buffer, this wait operation will block and save the current state and start at this point again when the next cell arrives.

Figure 4B:
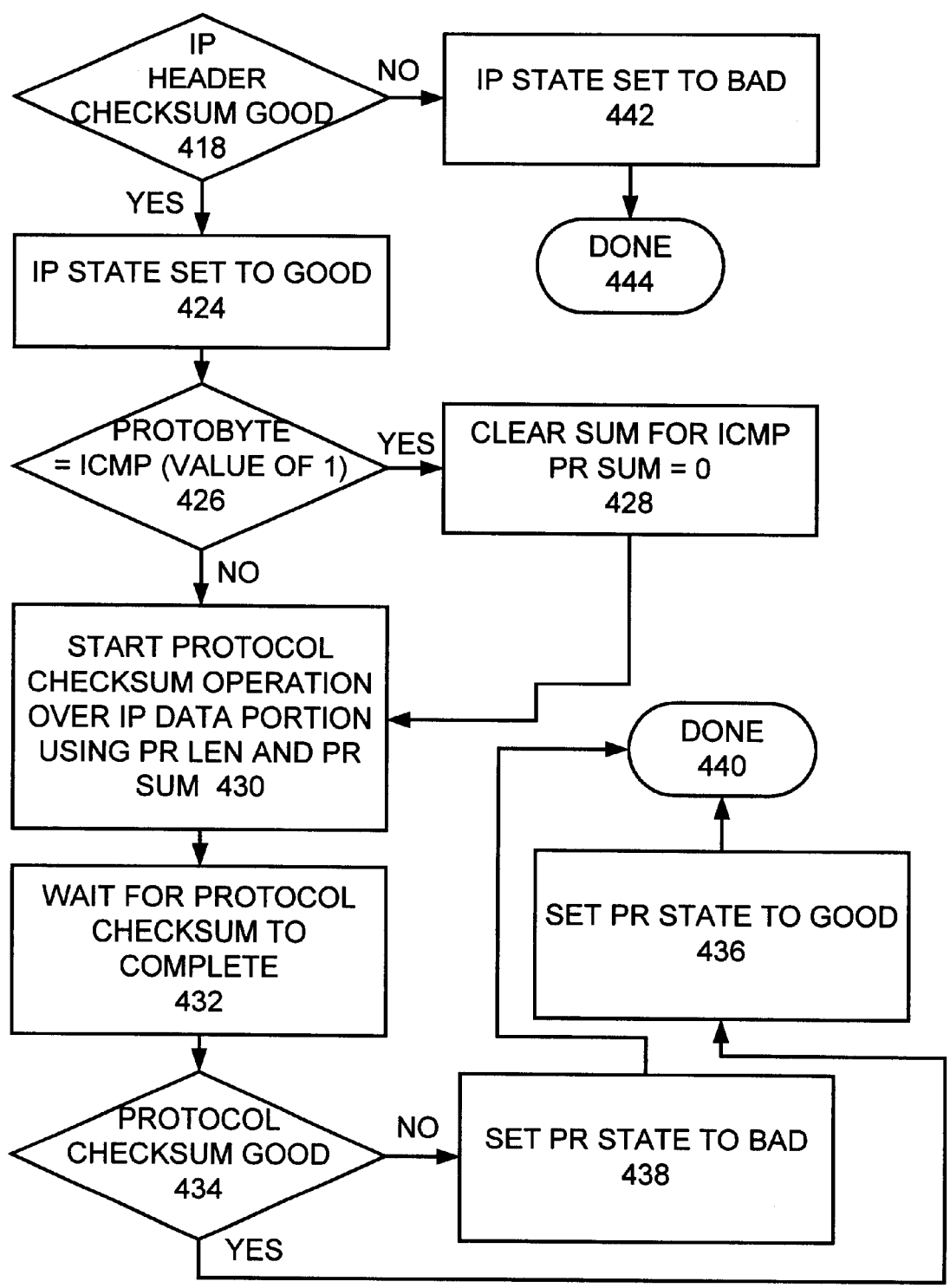

Referring to FIG. 4B, once the sums are complete, the IP checksum is checked to see if it is good as indicated at a decision block 418. If the IP checksum is good, then it is marked as good as indicated at a block 424 and we continue with checking the PROTOCOL byte and determine if the protocol checksum needs to be run and perform any particulars. As indicated at a decision block 426 if the PROTOCOL byte indicates ICMP, then because ICMP does not use the pseudo header, the PR SUM is cleared as indicated at a block 428. Next the protocol checksum over the IP data portion is started, starting at the end of the IP header and using the protocol length as indicated at a block 430. Next waiting for the protocol checksum to complete is provided as indicated at a block 432. This can be many cell times away. Again if the protocol checksum will not finish, then we checkpoint and resume as before.

If determined that the IP checksum is not good at decision block 418, then the packet is marked as having a bad IP checksum as indicated at a block 442 and the algorithm is done for this packet as indicated at a block 444. Finally, once complete checking the result is performed as indicated at a decision block 434. Then the protocol sum is marked as good or bad as indicated at blocks 436 and 438 to complete the operations as indicated in a block 440. When the packet is surfaced to the user, two sets of 2 bits are surfaced as well. Each set of bits indicates that the sum was good, bad, or not checked. The user then simply checks these bits for checksum verification.

Figure 3:
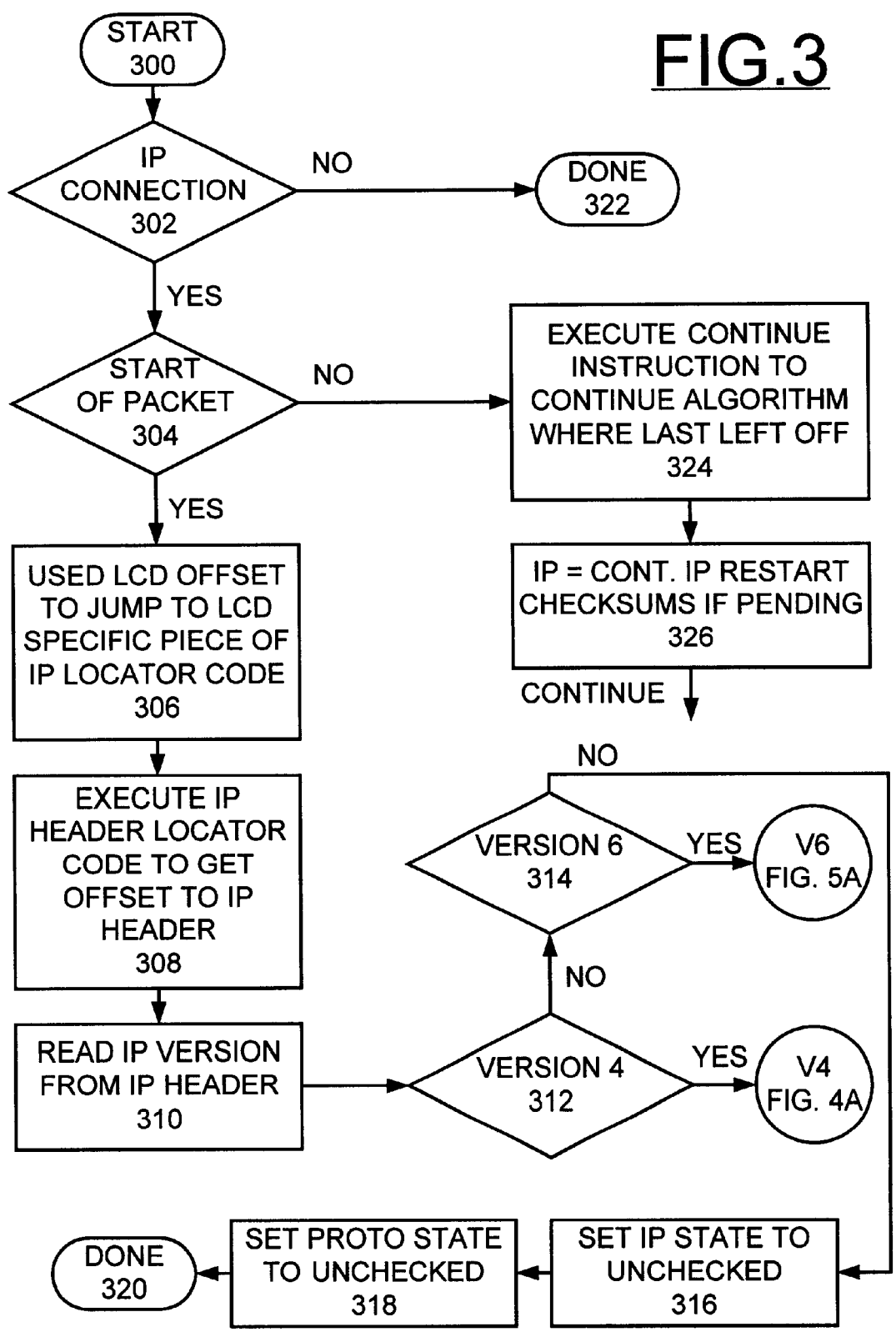
Figure 5B:
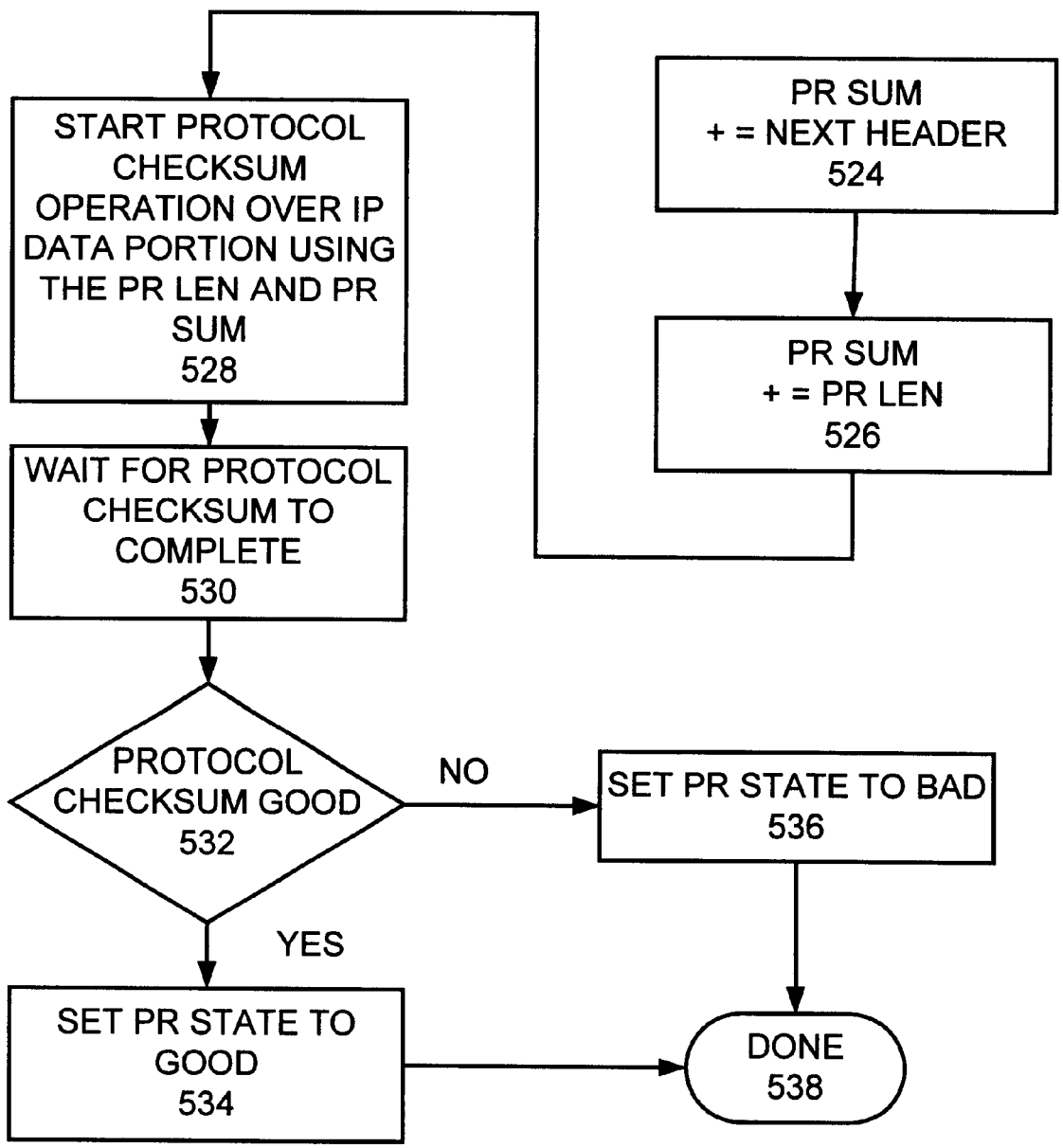

Referring now to FIGS. 5A and 5B, the sequential operations continue following entry point V6 in FIG. 5A from decision block 314 in FIG. 3. First the MSB and LSB payload length field are read as indicated at blocks 501 and 502. Two steps are needed for reading the MSB and LSB payload length field and the reads could block. A next header field is read and stored in the PROTOCOL byte as indicated at a block 504. The PR SUM is set to zero as indicated at a block 506. Then the checksum operation is started, starting at the offset of IP source address for 32 bytes as indicated at a block 508. The header length is set to 40 as indicated at a block 510. Then waiting for the checksum to complete is provided as indicated at a block 512. Next the offset is calculated by adding the current offset and the header length as indicated at a block 514. Then checking for next header equal to V6 ICMP or TCP or UDP is performed as indicated at a decision block 516. If the next header equals V6 ICMP or TCP or UDP, then the sequential operations continue with a block 524 in FIG. 5B. Otherwise, a next header field is read in next header as indicated at a block 518. An options header format is illustrated and described with respect to FIG. 9C. Then a next header length is read in the next header as indicated at a block 520. The protocol data length is adjusted as indicated at a block 522 by subtracting the header length. The offset is calculated at block 514 and the operations continue.

Referring to FIG. 5B, as indicated at a block 524 the next header is added to the PR SUM 218. Then the PR LEN 216 is added to the PR SUM 218 as indicated at a block 526. The protocol checksum over the IP data portion is started using the PR LEN 216 and the PR SUM 218 as indicated at a block 528. Waiting for the protocol checksum to complete is provided as indicated at a block 530. Once complete, checking the protocol checksum is performed as indicated at a decision block 532. If the protocol checksum is good, the protocol state is set to good as indicated at a block 534. Otherwise if the protocol checksum is bad, the protocol state is set to bad as indicated at a block 536. This completes the checksum verification operations as indicated in a block 538.

Figure 5C:
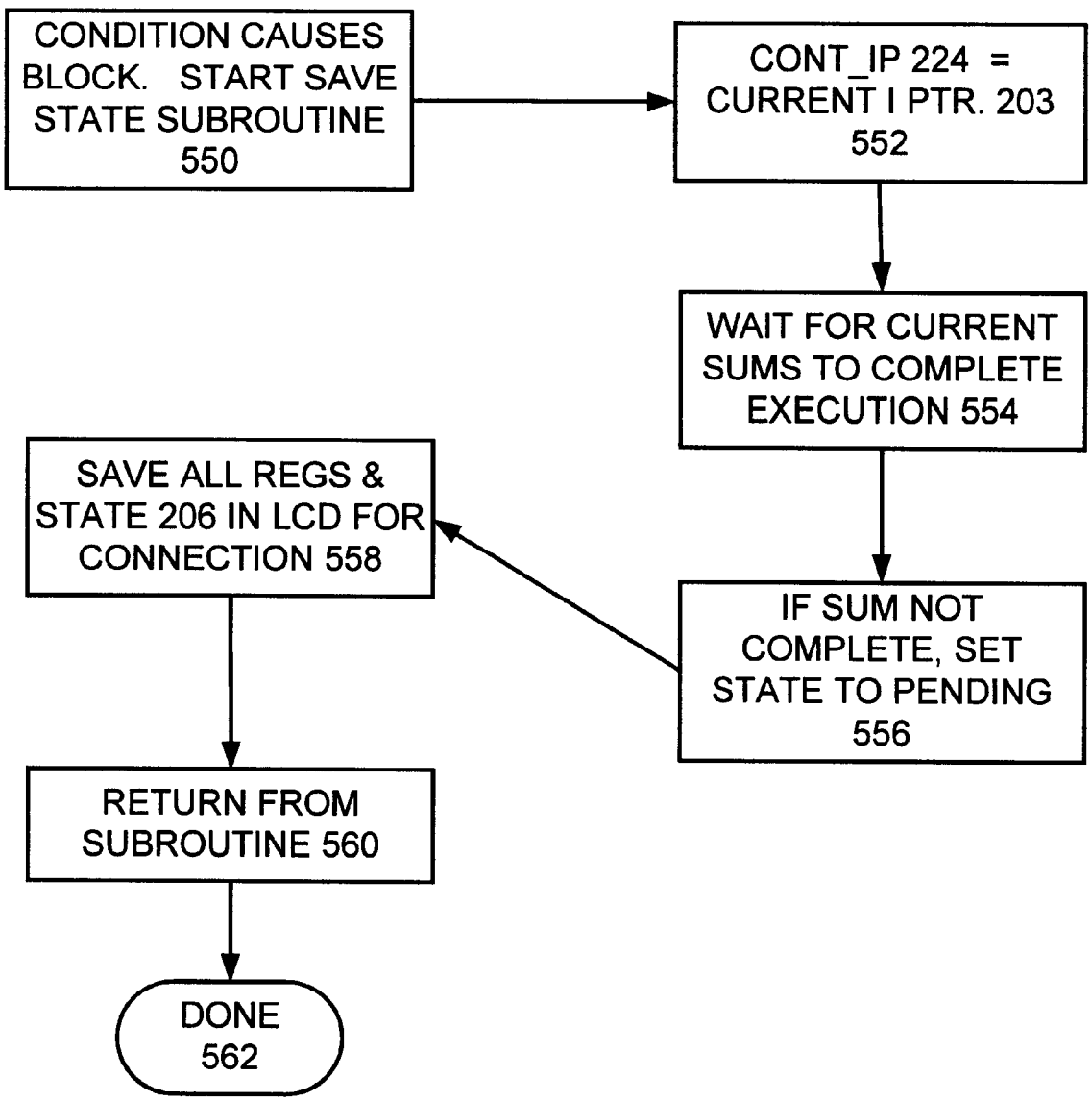

Referring to FIG. 5C, sequential steps for save state are shown. When a condition causes block, the save state subroutine is started as indicated at a block 550. First the CONT IP 224 is set to the current instruction pointer (IPTR) 203 as indicated at a block 552. Waiting for current sums to complete execution is provided as indicated at a block 554. If the sum is not complete, the state is set to pending as indicated at a block 556. All registers and state 206 for the connection are saved in the LCD as indicated at a block 558. Then returning from the subroutine at block 560 completes the save state subroutine as indicated at a block 562.

The checksum verification process is rather long and complex, particularly due to the fact that cells are being processed. The checksum verification process is accommodated in adapter 102 with the use of embedded processor architecture 200 with special purpose instructions and facilities that help compact the code and take care of all of the needed checkpointing and resumption. Without the facilities of embedded processor architecture 200, the checksum verification process would not be practical. The checksum verification process can be coded in about 40 to 50 instructions. However, the actual code path length for each cell is very short.

FIG. 6A illustrates an internet header format 600. The 4 bit Version field indicates the format of the internet header. The 4 bit Internet Header Length (IHL) is the length of the internet header in 32 bit words, and thus points to the beginning of the data. Note that the minimum value for a correct header is 5. The 8 bit type of Service provides an indication of the abstract parameters of the quality of service (QOS) desired. These parameters are to be used to guide the selection of the actual service parameters when transmitting a datagram through a particular network. Several networks offer service precedence, which somehow treats high precedence traffic as more important than other traffic (generally by accepting only traffic above a certain precedence at time of high load). The major choice is a three way tradeoff between low-delay, high-readability, and high-throughput.

Bits 0–2: Precedence
Bit 3: 0=Normal Delay, 1=Low Delay
Bits 4: 0=Normal Throughput, 1=High Throughput
Bits 5: 0=Normal Reliability, 1=High Reliability Precedence 111—Network Control 110—Internetwork Control

101—CRITIC/ECP

100—Flash Override

011—Flash

010—Immediate

001—Priority

000—Routine

The use of the Delay, Throughput, and Reliability indications may increase the cost in some sense of the service. In many networks, better performance for one of these parameters is coupled with worse performance on an other. Except for very unusual cases at most two of these three indications should be set.

The 8 bit type of service is used to specify the treatment of the datagram during its transmission through the internet system. Example mappings of the internet type of service to the actual service provided on networks such as AUTODIN II, ARPANET, SATNET, and PRNET is given in Service Mappings. The Network Control precedence designation is intended to be used within a network only. The actual use and control of that designation is up to each network. The Internetwork Control designation is intended for use by gateway control originators only. If the actual use of these precedence designations is of concern to a particular network, it is the responsibility of that network to control the access to, and use of, those precedence designations.

The 16 bit total Length is the length of the datagram, measured in octets, including internet header and data. This field allows the length of a datagram to be up to 65,535 octets. Such long datagrams are impractical for most hosts and networks. All hosts must be prepared to accept datagrams of up to 576 octets, whether they arrive whole or in fragments. It is recommended that host only send datagrams larger than 576 octets if they have assurance that the destination is prepared to accept the larger datagrams. The number 576 is selected to allow a reasonable sized data block to be transmitted in addition to the required header information. For example, this size allows a data block of 512 octets plus 64 header octets to fit in a datagram. The maximal internet header is 60 octets, and a typical internet header is 20 octets, allowing a margin for headers of higher level protocols.

A 16 bit identification or identifying value is assigned by the sender to aid in assembling the fragments of a datagram.

The 3-bit flags represent Various Control Flags as follows:

Bit 0: reserved, must be zero

Bit 1: (DF) 0=May Fragment, 1=Don't Fragment

Bit 2: (MF) 0=Last Fragment, 1=More Fragments

The 13 bit Fragment Offset field indicates where in the datagram this fragment belongs. The fragment offset is measured in units of 8 octets (64 bits). The first fragment has offset zero.

The 8 bit Time to Live field indicates the maximum time the datagram is allowed to remain in the internet system. If this field contains the value zero, then the datagram must be destroyed. This field is modified in internet header processing. The time is measured in units of seconds, but since every module that processes a datagram must decrease the time to live (TTL) by at least one even if it processes the datagram in less than a second, the TTL must be thought of only as an upper bound on the time a datagram may exist. The intention is to cause undeliverable datagrams to be discarded, and to bound the maximum datagram lifetime.

The 8 bit PROTOCOL field indicates the next level protocol used in the data portion of the internet datagram. The values for various protocols are specified in "Assigned Numbers".

A 16 bit header checksum is a checksum on the header only. Since some header fields change, for example, the time to live field, the header checksum is recomputed and verified at each point that the internet header is processed.

The checksum algorithm is:

The checksum field is the 16 bit ones complement of the ones complement sum of all 16 bit words in the header. For purposes of computing the checksum, the value of the checksum field is zero. This is a simple to compute checksum and experimental evidence indicates it is adequate, but it is provisional and may be replaced by a CRC procedure, depending on further experience.

The source address is a 32 bit address and the destination address is a 32 bit address.

The options variable may appear or not in datagrams. The options variables must be implemented by all IP modules, host and gateways. What is optional is their transmission in any particular datagram, not their implementation.

Referring now to FIG. 6B, an ICMP message format 610 is illustrated. ICMP messages 610 are sent using the basic IP header 600, as shown. The first octet of the data portion of the datagram is a ICMP type field. The value of the type field determines the format of the remaining data. Any field labeled "unused" is reserved for later extensions and must be zero when sent, but receivers should not use these fields, except to include them in the checksum.

Unless otherwise noted under the individual format descriptions, the values of the internet header fields are as follows for Version 4. Internet header length (IHL) is in 32-bit words. The type of Service is 0. Total length is the length of internet header and data in octets. Identification, Flags, Fragment Offset, Used in fragmentation. The Time to live field in seconds is decremented at each machine in which the datagram is processed. The value in this field should be at least as great as the number of gateways which this datagram will traverse. The Protocol byte, the ICMP=1. The Header Checksum is the 16 bit ones complement of the ones complement sum of all 16 bit words in the header. For computing the checksum, the checksum field should be zero. This checksum may be replaced in the future. The Source Address is the address of the gateway or host that composes the ICMP message. Unless otherwise noted, this can be any of a gateway's addresses. The Destination Address is the address of the gateway or host to which the message should be sent.

The ICMP fields of the ICMP message format 610 includes the Type 3, and the Code is defined as follows:

Code

0=net unreachable;

1=host unreachable;

2=protocol unreachable;

3=port unreachable;

4=fragmentation needed and DF set;

5=source route failed.

The checksum of the ICMP message format 610 is the 16-bit ones complement of the ones complement sum of the ICMP message starting with the ICMP Type. For computing the checksum, the checksum field should be zero. This checksum may be replaced in the future. The Internet Header 600 plus 64 bits of original Data Datagram is used by the host to match the message to the appropriated process. If a higher level protocol uses port numbers, they are assumed to be in the first 64 data bits of the original datagram data.

Figure 7A:
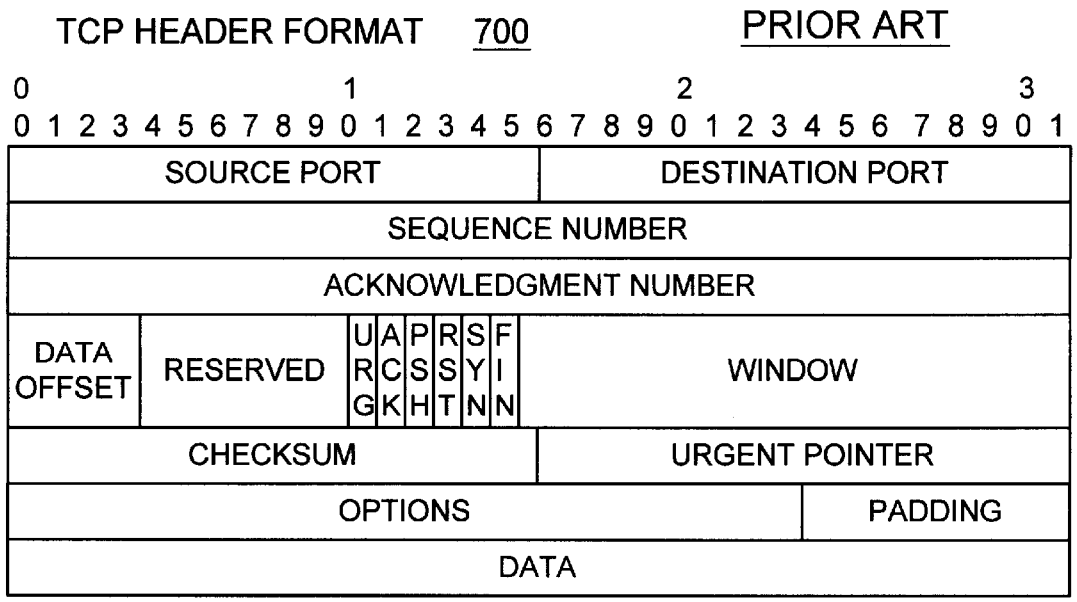
FIG. 7A is a diagram illustrating an exemplary transmission communication protocol (TCP) header format.

Referring to FIG. 7A, the TCP Header Format 700 is illustrated. TCP segments are sent as internet datagrams. The Internet Protocol header carries several information fields, including the source and destination host addresses or ports. A TCP header follows the internet header, supplying information specific to the TCP protocol. This division allows for the existence of host level protocols other than TCP.

The TCP Header Format 700 includes a Source Port field or source port number of 16 bits; a Destination Port field or destination port number of 16 bits; and a Sequence Number of 32 bits. The sequence number indicates the first data octet in this segment, except when SYN is present. If SYN is present the sequence number is the initial sequence number (ISN) and the first data octet is ISN+1. The TCP Header Format 700 includes an Acknowledgment Number of 32 bits. If the ACK control bit is set this field contains the value of the next sequence number the sender of the segment is expecting to receive. Once a connection is established this is always sent. The TCP Header Format 700 includes a Data Offset of 4 bits. The Data Offset indicates the number of 32 bit words in the TCP Header and indicates where the data begins. The TCP header (even one including options) is an integral number of 32 bits long. The Reserved field of 6 bits is reserved for future use and must be zero. The Control Bits field of 6 bits is defined as follows (from left to right):

URG: Urgent Pointer field significant

ACK: Acknowledgment field significant

PSH: Push Function

RST: Reset the connection

SYN: Synchronize sequence numbers

FIN: No more data from sender

A Window field of 16 bits indicates the number of data octets beginning with the one indicated in acknowledgment field which the sender of this segment is willing to accept.

The Checksum field of 16 bits is the 16 bit ones complement of the ones complement sum of all 16 bit words in the header and text. If a segment contains an odd number of header and text octets to be checksummed, the last octet is padded on the right with zeros to form a 16 bit word for checksum purposes. The pad is not transmitted as part of the segment. While computing the checksum, the checksum field itself is replaced with zeros.

Figure 7B:
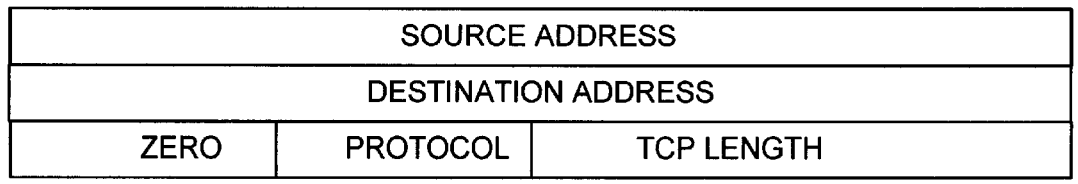
FIG. 7B is a diagram illustrating an exemplary transmission communication protocol (TCP) pseudo header format.

Referring also to FIG. 7B, the checksum also covers a 96 bit pseudo header 710 conceptually prefixed to the TCP header. This TCP pseudo header 710 contains the Source Address, the Destination Address, the Protocol, and TCP length. This gives the TCP protection against misrouted segments. This information is carried in the Internet Protocol and is transferred across the TCP/Network interface in the arguments or results of calls by the TCP on the IP.

The TCP Length of TCP pseudo header 710 is the TCP header length plus the data length in octets which is not an explicitly transmitted quantity, but is computed, and it does not count the 12 octets of the pseudo header.

Referring to FIG. 8A, the UDP Datagram header format 800 is illustrated. The illustrated Source Port is an optional field, when meaningful, it indicates the port of the sending process, and may be assumed to be the port to which a reply should be addressed in the absence of any other information. If not used, a value of zero is inserted. The Destination Port has a meaning within the context of a particular internet destination address. The Length field indicates the length in octets of this user datagram including this header and the data. This means the minimum value of the length is eight. The Checksum is the 16-bit ones complement of the ones complement sum of a pseudo header of information from the IP header, the UDP header, and the data, padded with zero octets at the end, if necessary, to make a multiple of two octets.

Referring to FIG. 8B, the pseudo header 810 conceptually prefixed to the UDP header is illustrated. UDP pseudo header 810 contains the source address, the destination address, a zero field, the PROTOCOL byte, and the UDP length. This information gives protection against misrouted datagrams. The UDP checksum procedure is the same as is used in TCP. If the computed checksum is zero, it is transmitted as all ones; the equivalent in ones complement arithmetic.

Referring to FIG. 9A, the internet protocol IP version 6 header format 900 is shown. The internet protocol IP version 6 header format 900 includes 40 bytes. The Version field is the 4-bit Internet Protocol version number that equals 6. The Prio. is a 4-bit priority value. The Flow Label field is a 24-bit flow label. The Payload Length is a 16-bit unsigned integer. Length of payload, i.e., the rest of the packet following the IP V6 header, in octets. The Next Header is an 8-bit selector that identifies the type of header immediately following the IP V6 header. The Next Header Uses the same values as the IP V4 Protocol field. The Hop Limit is an 8-bit unsigned integer that is decremented by 1 by each node that forwards the packet. The packet is discarded is Hop Limit is decremented to zero. The Source Address is a 128-bit address of the originator of the packet and the Destination Address is a 128-bit address of the destination for the packet.

Any transport or other upper-layer protocol that includes the addresses from the IP header in its checksum computation must be modified for use over IP V6, to include the 128-bit IP V6 source and destination addresses instead of 32-bit IP V4 addresses. FIG. 9B illustrates the TCP, UDP and ICMP pseudo-header for IP V6 generally designated 910. If the packet contains a Routing header, the Destination Address used in the Pseudo header 910 is that of the final destination. At the originating node, that address will be in the last element of the Routing header; at the recipient(s), that address will be in the Destination Address field of the IP V6 header. The Next Header value in the pseudo header 910 identifies the upper-layer protocol, for example, 6 for TCP, 17 for UDP, or 58 for ICMP. It will differ from the Next Header value in the IP V6 header if there are extension headers between the IP V6 header and the upper-layer header. The Payload Length used in the pseudo header 910 is the length of the upper-layer packet, including the upper-layer header.

Unlike IP V4, when UDP packets are originated by an IP V6 node, the UDP checksum is not optional. That is, whenever originating a UDP packet, an IP V6 node must compute a UDP checksum over the packet and the pseudo header 910, and if that computation yields a result of zero, it must be changed to hex FFFF for placement in the UDP header. IP V6 receivers must discard UDP packets containing zero checksum, and should log the error.

The IP V6 version of ICMP includes the pseudo-header 910 in its checksum computation; this is a change from the IP V4 version of ICMP, which does not include a pseudo header in its checksum. The reason for the change is to protect ICMP from misdelivery or corruption of those fields of the IP V6 header on which it depends, which, unlike IP V4, are not covered by an internet-layer checksum. The Next Header field in the pseudo header 910 for ICMP contains the value 58, which identifies the IP V6 version of ICMP.

Unlike IP V4, IP V6 nodes are not required to enforce maximum packet lifetime. That is the reason the IP V4 Time to Live field is renamed the Hop Limit in IP V6. In practice, very few, if any, IP V4 implementations conform to the requirement that they limit packet lifetime, so this is not a change in practice. Any upper-layer protocol that relies on the internet layer (whether IP V4 or IP V6) to limit packet lifetime ought to be upgraded to provide its own mechanisms for detecting and discarding obsolete packets.

When computing the maximum payload size available for upper-layer data, an upper-layer protocol must take into account the larger size of the IP V6 header relative to the IP V4 header. When using TCP over IP V6, the MSS must be computed as the maximum packet size minus 60 octets, because the minimum-length IP V6 header (i.e., an IP V6 header with no extension headers) is 20 octets longer than a minimum-length IP V4 header.

Referring to FIG. 9C, an options header for IP V6 generally designated by 920 is illustrated. The options header 920 is between the IP header and the protocol header. The options header 920 is the general format of the next header in IP V6. The options header 920 includes the next header field and the header extension length field. The next header field is an 8-bit selector field that identifies the type of header immediately following the Destination Options header. The header extension length field is an 8-bit unsigned integer indicating the length of the Destination Options header in 8-octet units, not including the first 8 octets.

Figure 10:
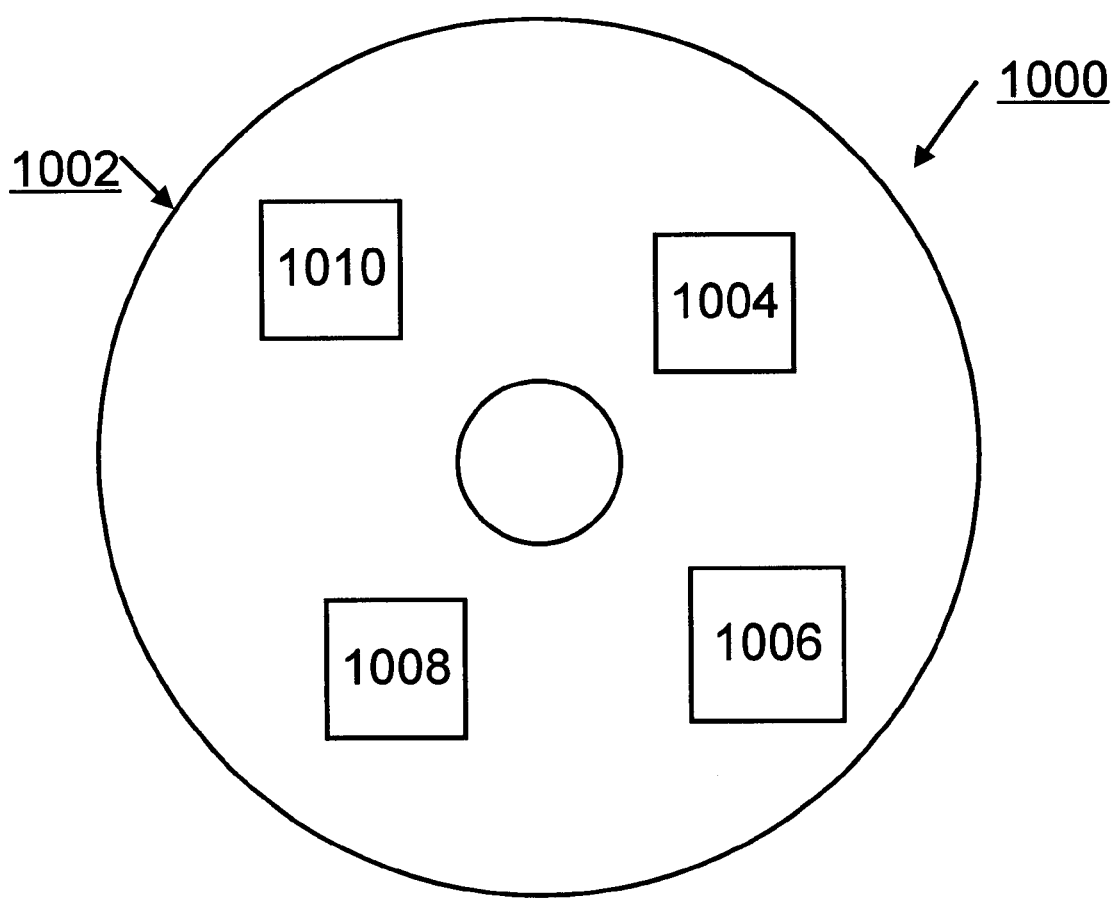
FIG. 10 is a block diagram illustrating a computer program product in accordance with the invention.

Referring now to FIG. 10, an article of manufacture or a computer program product 1000 of the invention is illustrated. The computer program product 1000 includes a recording medium 1002, such as, a floppy disk, a high capacity read only memory in the form of an optically read compact disk or CD-ROM, a tape, a transmission type media such as a digital or analog communications link, or a similar computer program product. Recording medium 1002 stores program means 1004, 1006, 1008, 1010 on the medium 1002 for carrying out the for checksum verification methods with receive packet processing of the preferred embodiment.

A sequence of program instructions or a logical assembly of one or more interrelated modules defined by the recorded program means 1004, 1006, 1008, 1010, direct adapter 102 for carrying out the for checksum verification functions with receive packet processing of the preferred embodiment.

While the present invention has been described with reference to the details of the embodiments of the invention shown in the drawing, these details are not intended to limit the scope of the invention as claimed in the appended claims.

What is claimed is:

1. A method for checksum verification with received packet processing for data communications comprising the steps of:
   identifying a data communications connection;
   responsive to an identified data communications connection, identifying a start of data packet;
   calculating a header checksum and a protocol checksum for a full checksum verification including the steps of;
   responsive to an identified start of data packet, calculating said header checksum including the steps of; identifying a start of a protocol header; identifying a protocol version for said data communications connection; responsive to said identified protocol version, calculating a header length and starting a checksum operation across said header;
   calculating said protocol checksum including a protocol pseudo header and data; calculating said protocol pseudo header including the steps of adding a protocol data length value to said protocol checksum.

2. A method for checksum verification with received packet processing for data communications as recited in claim 1 wherein the step of calculating said header checksum includes the steps of identifying a next data packet and executing a continue instruction.

3. A method for checksum verification with received packet processing for data communications as recited in claim 2 includes the step of continuing the calculation of said header checksum.

4. A method for checksum verification with received packet processing for data communications as recited in claim 1 wherein the step of calculating said protocol checksum including a protocol pseudo header and data includes the steps of identifying a next data packet and executing a continue instruction.

5. A method for checksum verification with received packet processing for data communications as recited in claim 4 includes the step of continuing the calculation of said protocol checksum.

6. A method for checksum verification with received packet processing for data communications as recited in claim 1 wherein the steps of calculating said header checksum and calculating said protocol checksum includes the step of waiting for both said checksum operations to complete.

7. A method for checksum verification with received packet processing for data communications as recited in claim 1 includes the step of checking the calculated protocol checksum and setting a protocol state for said calculated protocol checksum.

8. A method for checksum verification with received packet processing for data communications as recited in claim 1 wherein the steps of calculating said header checksum and calculating said protocol checksum includes the step of identifying a blocking condition, saving the current state, and then restoring state to restart the process.

9. Apparatus for checksum verification with received packet processing for data communications comprising:
   means for identifying a data communications connection;
   means, responsive to an identified data communications connection, for identifying a start of data packet;
   means for calculating a header checksum and a protocol checksum for a full checksum verification including;
   means, responsive to an identified start of data packet, for calculating said header checksum including means for identifying a start of a protocol header; means for identifying a protocol version for said data communications connection; means responsive to said identified protocol version, for calculating a header length and means for starting a checksum operation across said header; and
   means for calculating said protocol checksum including a protocol pseudo header and data; said means for calculating said protocol pseudo header including means for adding a protocol data length value to said protocol checksum.

10. Apparatus for checksum verification with received packet processing for data communications as recited in claim 9 wherein said means for calculating said header checksum and said means for calculating said protocol checksum includes means for waiting for both said checksum operations to complete.

11. Apparatus for checksum verification with received packet processing for data communications as recited in claim 10 further includes means for checking the calculated protocol checksum and means for setting a protocol state for said calculated protocol checksum.

12. Apparatus for checksum verification with received packet processing for data communications as recited in claim 9 includes an embedded processor structure.

13. Apparatus for checksum verification with received packet processing for data communications as recited in claim 12 wherein said embedded processor structure is arranged for tracking packet state and for running CRC calculations across received packets, and for performing full checksum verification.

14. Apparatus for checksum verification with received packet processing for data communications as recited in claim 12 wherein said embedded processor structure includes an arithmetic logic unit and a checksum state machine.

15. Apparatus for checksum verification with received packet processing for data communications as recited in claim 12 wherein said embedded processor structure includes registers for storing configuration information for said identified data communications connection and for storing data packet state information.

16. A computer program product for use with an adapter for implementing checksum verification with received packet processing for data communications, the computer program product comprising:

a recording medium;

means, recorded on said recording medium, for identifying a data communications connection;

means, recorded on said recording medium, responsive to an identified data communications connection, for identifying a start of data packet;

means, recorded on said recording medium, for calculating a header checksum and a protocol checksum for a full checksum verification including;

means, recorded on said recording medium, responsive to an identified start of data packet, for calculating said header checksum including means, recorded on said recording medium, for identifying a start of a protocol header; means, recorded on said recording medium, for identifying a protocol version for said data communications connection; means, recorded on said recording medium, responsive to said identified protocol version, for calculating a header length and means, recorded on said recording medium, for starting a checksum operation across said header; and means, recorded on said recording medium, for calculating said protocol checksum including a protocol pseudo header and data; said means, recorded on said recording medium, for calculating said protocol pseudo header including means recorded on said recording medium, for adding a protocol data length value to said protocol checksum.

* * * * *